(12) United States Patent
Navon et al.

(10) Patent No.: US 11,188,456 B2
(45) Date of Patent: Nov. 30, 2021

(54) STORAGE SYSTEM AND METHOD FOR PREDICTIVE BLOCK ALLOCATION FOR EFFICIENT GARBAGE COLLECTION

(71) Applicant: Western Digital Technologies Inc., Irvine, CA (US)

(72) Inventors: Ariel Navon, Revava (IL); Micha Yonin, Nes Tziona (IL); Alexander Bazarsky, Holon (IL); Judah Gamliel Hahn, Ofra (IL); David Gur, Ofra (IL); Omer Fainzilber, Even Yehuda (IL)

(73) Assignee: Western Digital Technologies Inc.

( * ) Notice: Subject to any disclaimer, the term of this patent is extended or adjusted under 35 U.S.C. 154(b) by 397 days.

(21) Appl. No.: 15/465,367

(22) Filed: Mar. 21, 2017

(65) Prior Publication Data

US 2018/0276113 A1    Sep. 27, 2018

(51) Int. Cl.
  *G06F 12/02*        (2006.01)
  *G06F 3/06*         (2006.01)
(52) U.S. Cl.
  CPC .......... *G06F 12/0246* (2013.01); *G06F 3/064* (2013.01); *G06F 3/0608* (2013.01); *G06F 3/0631* (2013.01); *G06F 3/0679* (2013.01); *G06F 3/0688* (2013.01); *G06F 3/0652* (2013.01); *G06F 2212/1044* (2013.01); *G06F 2212/2022* (2013.01); *G06F 2212/7205* (2013.01); *G06F 2212/7208* (2013.01)
(58) Field of Classification Search
  CPC .............. G06N 5/022; F06F 2212/1044; F06F 2212/2022; F06F 2212/7205; G06F 12/0246; G06F 3/0608; G06F 3/0631; G06F 3/064; G06F 3/0652; G06F 3/0688; G06F 3/088
See application file for complete search history.

(56) References Cited

U.S. PATENT DOCUMENTS

| 5,691,948 A | 11/1997 | Sakabe |
| 7,383,457 B1 | 6/2008 | Knight |
| 7,996,642 B1 | 8/2011 | Smith |
| 8,032,724 B1 | 10/2011 | Smith |

(Continued)

FOREIGN PATENT DOCUMENTS

WO    WO 2010/080172 A1    7/2010

OTHER PUBLICATIONS

U.S. Appl. No. 14/803,732, filed Jul. 20, 2015, Tzafrir et al.

(Continued)

*Primary Examiner* — Andrew J Cheong
(74) *Attorney, Agent, or Firm* — Dickinson Wright PLLC; Steven Hurles (57) ABSTRACT

A storage system and method for predictive block allocation for efficient garbage collection are provided. One method involves determining whether a memory in a storage system is being used in a first usage scenario or a second usage scenario; in response to determining that the memory is being used in the first usage scenario, using a first block allocation method; and in response to determining that the memory is being used in the second usage scenario, using a second block allocation method, wherein the first block allocation method allocates blocks that are closer to needing garbage collection than the second block allocation method.

24 Claims, 6 Drawing Sheets

(56) References Cited

U.S. PATENT DOCUMENTS

| | | | |
|---|---|---|---|
| 8,364,918 B1 | 1/2013 | Smith | |
| 8,843,712 B1 | 9/2014 | Smith | |
| 9,405,344 B1 | 8/2016 | Rosen | |
| 9,569,352 B2 | 2/2017 | Marcu et al. | |
| 2005/0198542 A1 | 9/2005 | Freker et al. | |
| 2006/0259791 A1 | 11/2006 | Dockser | |
| 2007/0008805 A1* | 1/2007 | Jung | G11C 8/08 365/230.06 |
| 2008/0034174 A1* | 2/2008 | Traister | G06F 12/0246 711/159 |
| 2009/0254499 A1* | 10/2009 | Deyo | G06Q 10/10 706/12 |
| 2010/0169588 A1* | 7/2010 | Sinclair | G06F 12/0246 711/160 |
| 2012/0151238 A1 | 6/2012 | Yang | |
| 2012/0159209 A1 | 6/2012 | Stemen et al. | |
| 2013/0100849 A1* | 4/2013 | Szabo | G06K 9/6267 370/253 |
| 2013/0138867 A1 | 5/2013 | Craft et al. | |
| 2013/0173875 A1* | 7/2013 | Kim | G06F 12/0246 711/160 |
| 2013/0290758 A1 | 10/2013 | Quick et al. | |
| 2014/0032817 A1 | 1/2014 | Bux et al. | |
| 2014/0047169 A1 | 2/2014 | Seo et al. | |
| 2014/0115239 A1* | 4/2014 | Kong | G06F 12/0246 711/103 |
| 2014/0269127 A1 | 9/2014 | Hung et al. | |
| 2015/0026413 A1 | 1/2015 | Meier et al. | |
| 2015/0121106 A1 | 4/2015 | Eckert | |
| 2015/0169443 A1 | 6/2015 | Lee | |
| 2015/0347029 A1* | 12/2015 | Kotte | G06F 3/0611 711/103 |
| 2015/0347030 A1* | 12/2015 | Mathur | G06F 3/0611 711/118 |
| 2015/0347040 A1* | 12/2015 | Mathur | G06F 3/0616 711/103 |
| 2015/0347041 A1* | 12/2015 | Kotte | G06F 3/0616 711/103 |
| 2015/0358286 A1 | 12/2015 | Raffill et al. | |
| 2016/0092114 A1* | 3/2016 | Zhang | G06F 3/0608 711/102 |
| 2016/0179386 A1* | 6/2016 | Zhang | G06F 3/0679 711/103 |
| 2016/0335179 A1* | 11/2016 | Lee | G06F 12/0246 |
| 2016/0350214 A1 | 12/2016 | Payer et al. | |
| 2016/0357480 A1* | 12/2016 | Choi | G06F 12/0246 |
| 2017/0024002 A1 | 1/2017 | Tzafrir et al. | |
| 2017/0109101 A1 | 4/2017 | Hanson et al. | |
| 2018/0077236 A1 | 3/2018 | Nikura et al. | |
| 2018/0136839 A1* | 5/2018 | Brue | G06F 3/061 |

OTHER PUBLICATIONS

U.S. Appl. No. 15/911,815, filed Mar. 5, 2018, Hahn et al.
International Search Report and Written Opinion in corresponding International Application No. PCT/US2016/036354, dated Sep. 5, 2016, 13 pages.
Non-Final Rejection from U.S. Appl. No. 14/803,732 dated Jan. 12, 2017, pp. 1-12.
Final Rejection from U.S. Appl. No. 14/803,732 dated May 4, 2017, pp. 1-8.
Non-Final Rejection from U.S. Appl. No. 14/803,732 dated Sep. 6, 2017, pp. 1-8.
Non-Final Office Action in U.S. Appl. No. 15/911,815 dated Jul. 5, 2018, 19 pages.
Notice of Allowance in U.S. Appl. No. 14/803,732 dated Jun. 1, 2018, 8 pages.
Notice of Allowance in U.S. Appl. No. 14/803,732 dated Jul. 9, 2018, 2 pages.

* cited by examiner

STORAGE SYSTEM AND METHOD FOR PREDICTIVE BLOCK ALLOCATION FOR EFFICIENT GARBAGE COLLECTION

BACKGROUND

A storage system can have a memory that is organized into blocks. Over time, data written in a block can be invalidated (e.g., because of host data deletion and/or data transfers internal to the storage system). Garbage collection is a process that collects the valid parts of used memory blocks (ignoring the invalidated parts) and moves them to a new block. When a block is fully invalidated, it is returned to the free block pool. Garbage collection can be controlled by keeping a "valid counter" for each block to track the number of valid flash management units in the block and/or by a program/erase cycle counter to monitor the block's endurance. A garbage collection algorithm can choose which block should be "collected" next by checking which block has the lowest "valid counter," the highest program/erase cycle counter, and/or a program/erase cycle counter that is below average.

DETAILED DESCRIPTION

By way of introduction, the below embodiments relate to a storage system and method for predictive block allocation for efficient garbage collection. In one embodiment, a method for block allocation is provided. The method comprises determining whether a memory in a storage system is being used in a first usage scenario or a second usage scenario; in response to determining that the memory is being used in the first usage scenario, using a first block allocation method; and in response to determining that the memory is being used in the second usage scenario, using a second block allocation method, wherein the first block allocation method allocates blocks that are closer to needing garbage collection than the second block allocation method.

In some embodiments, the determining is performed by comparing a plurality of write commands to patterns stored in the storage system, wherein the first block allocation method is associated with one of the patterns, and wherein the second block allocation method is associated with another one of the patterns.

In some embodiments, the determining is performed using machine learning. In some embodiments, the machine learning uses supervised learning, whereas, in other embodiments, the machine learning uses unsupervised learning.

In some embodiments, the determining is performed by calculating a ratio of user single address updates versus drive rewrites.

In some embodiments, the determining is performed by receiving an indication from a host as to whether the memory is being used in the first usage scenario or in the second usage scenario.

In some embodiments, the method further comprises altering a time of garbage collection.

In some embodiments, the time of garbage collection is altered by adjusting at least one threshold parameter for initiating garbage collection.

In some embodiments, the time of garbage collection is altered by altering a ratio of triggering garbage collection operations versus host write.

In some embodiments, the time of garbage collection is altered by altering a ratio of dynamic versus static garbage collection operations.

In some embodiments, data stored in the first usage scenario is updated less frequently than data stored in the second usage scenario.

In some embodiments, the memory comprises a three-dimensional memory.

In some embodiments, the method is performed in the storage system.

In another embodiment, a storage system is provided comprising a memory and a controller. The controller is configured to receive a plurality of write commands; compare the plurality of write commands to patterns stored in the storage system; for each pattern, generate a score that represents a matching level of the plurality of write commands to that pattern; determine which score exceeds a threshold; and choose a block allocation scheme associated with the pattern whose score exceeds the threshold.

In some embodiments, a block allocation scheme associated with a first pattern allocates blocks that are closer to needing garbage collection than a block allocation scheme associated with a second pattern.

In some embodiments, the controller is further configured to adjust at least one threshold parameter for initiating garbage collection.

In some embodiments, the memory comprises a three-dimensional memory.

In some embodiments, the storage system is embedded in a host.

In some embodiments, the storage system is removably connected to a host.

In another embodiment, a storage system is provided comprising a memory; means for determining how the memory is being used; and means for choosing a block allocation method based on how the memory is being used, wherein a first block allocation method is chosen in response to determining that the memory is being used in a first usage scenario, and wherein a second block allocation method is chosen in response to determining that the memory is being used in a second usage scenario, further wherein the first block allocation method allocates blocks that are closer to needing garbage collection than the second block allocation method.

In some embodiments, the means for determining and the means for choosing comprise a controller.

In some embodiments, the memory comprises a three-dimensional memory.

Other embodiments are possible, and each of the embodiments can be used alone or together in combination. Accordingly, various embodiments will now be described with reference to the attached drawings.

Figures 1A, 1B:
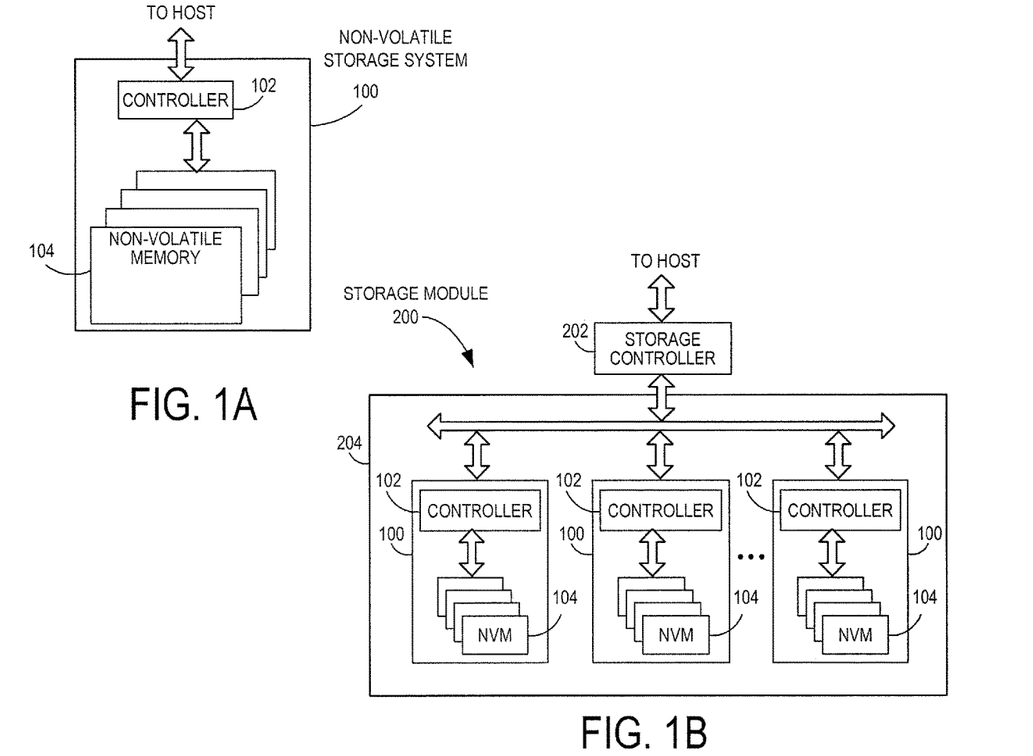
FIG. 1A is a block diagram of a non-volatile storage system of an embodiment.
FIG. 1B is a block diagram illustrating a storage module of an embodiment.
Figure 1C:
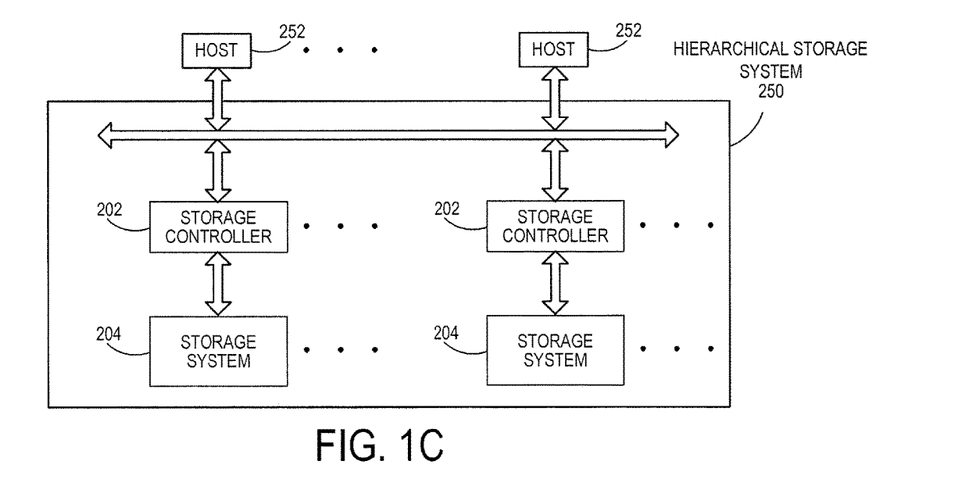
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
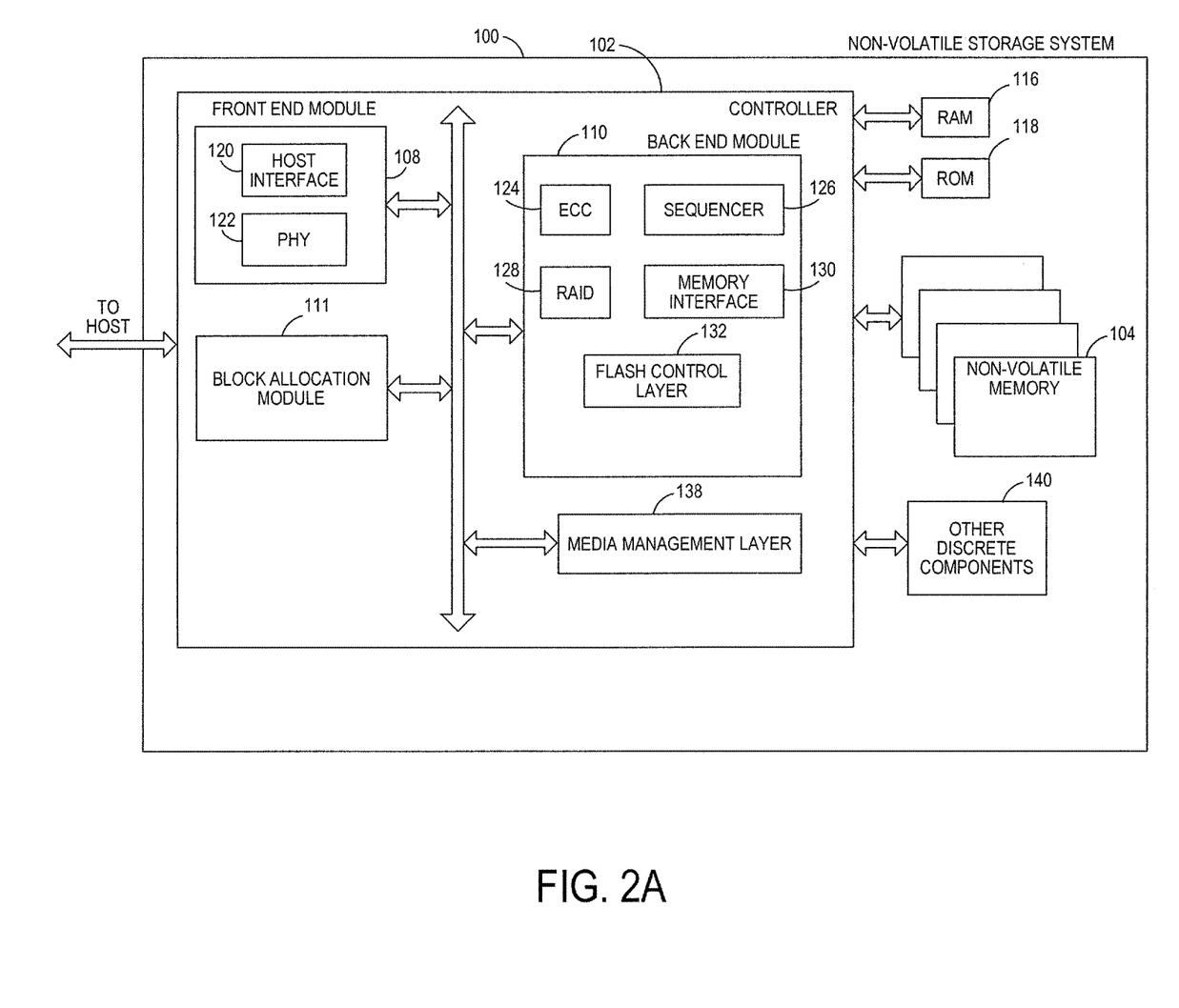
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a block allocation module 111, which is discussed in more detail below, and can be implemented in hardware or software/firmware. Also, as will become clear from the below, the controller 102, along with a hardware and/or software configuration to perform the algorithms discussed herein and shown in the drawings, can provide means for predicting usage behavior of the memory and means for allocating a block based on the predicted usage behavior.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
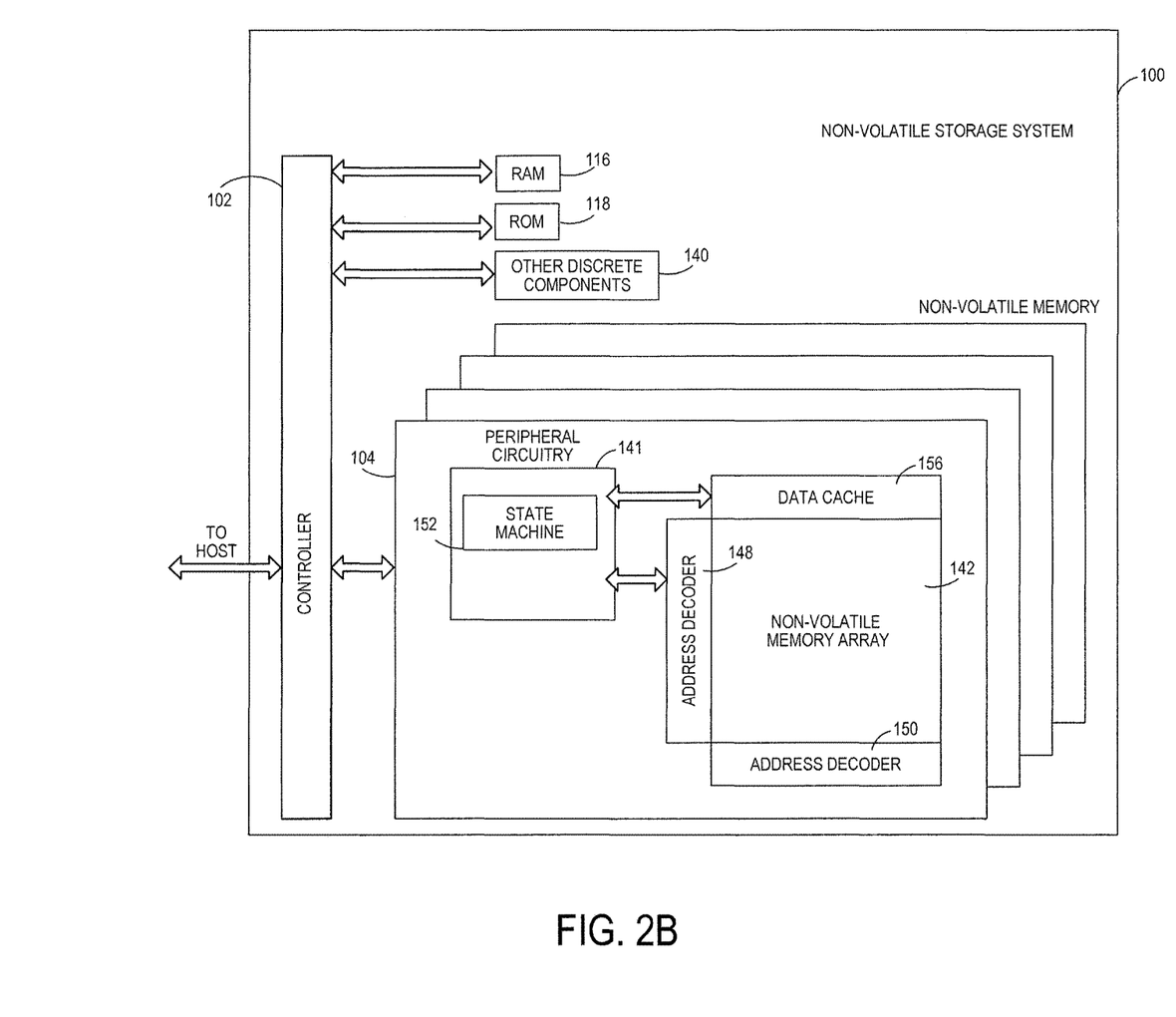
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to the controller 102. Non-volatile memory die 104 further includes a data cache 156 that caches data.

As mentioned above, a storage system can have a memory that is organized into blocks. (As used herein, a block is a set of memory cells.) Over time, data written in a block can be invalidated (e.g., because of host data deletion and/or data transfers internal to the storage system). Garbage collection is a process that collects the valid parts of used memory blocks (ignoring the invalidated parts) and moves them to a new block. When a block is fully invalidated, it is returned to the free block pool. Garbage collection can be controlled by keeping a "valid counter" for each block to track the number of valid flash management units in the block and/or by a program/erase cycle counter to monitor the block's endurance. A garbage collection algorithm can choose which block should be "collected" next by checking which block has the lowest "valid counter," the highest program/erase cycle counter, and/or a program/erase cycle counter that is below average.

Garbage collection may hinder host performance as it uses the interface from the storage system's controller to the memory and also uses space in both the storage system's controller and memory. Efficient garbage collection, both in terms of memory and performance, is very useful. The following embodiments provide a method for predicting usage behavior and choosing a block allocation method that will effectively alter garbage collection. That is, these embodiments can use the predicted behavior of a user or host in the process of choosing the next block to allocate and/or in the process of choosing the garbage collection schedule. By using adaptive block allocation in the process of garbage collection, based on the usage scenario of current device, these embodiments can be used to provide a more-efficient approach than prior designs.

Figure 3:
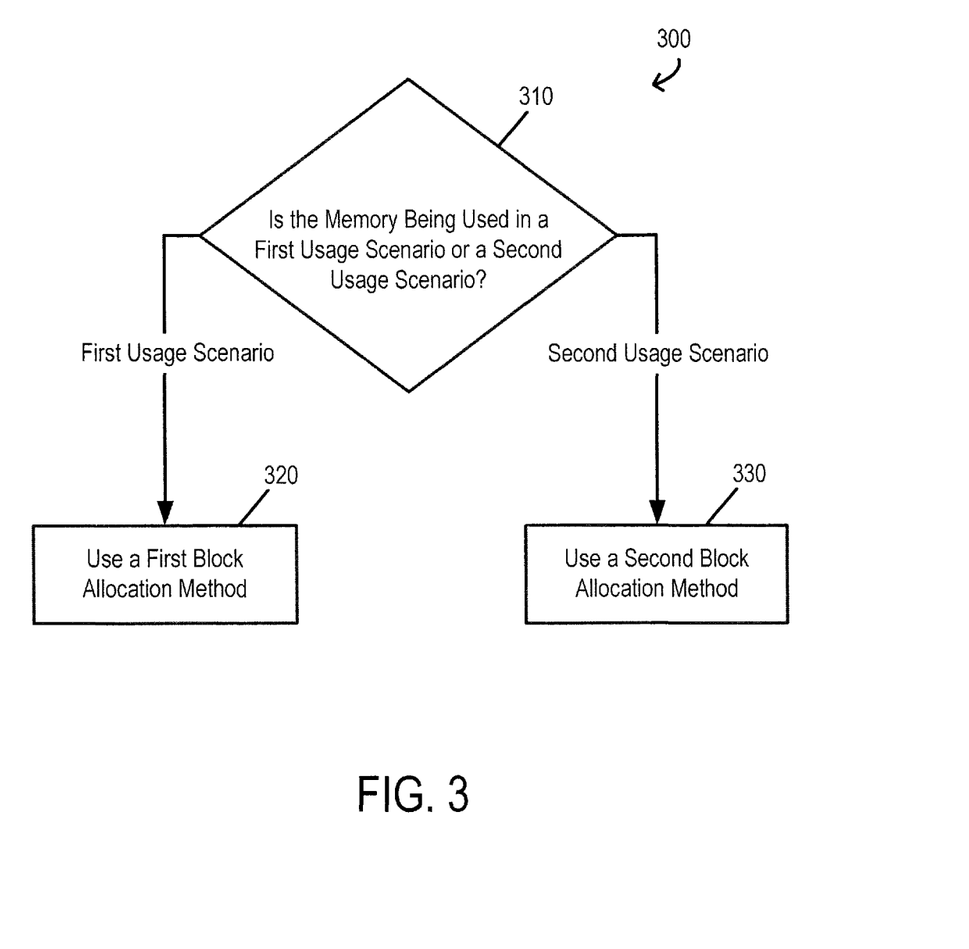
FIG. 3 is a flow chart of a method for predictive block allocation for efficient garbage collection of an embodiment.

Turning now to the drawings, FIG. 3 is a flow chart 300 of a method of an embodiment for predictive block allocation for efficient garbage collection. As shown in FIG. 3, in this embodiment, the storage system 100 (e.g., the controller 102 or the block allocation module 111) determines whether the memory is being used in a first usage scenario or a second usage scenario (act 310). In response to determining that the memory 104 is being used in the first usage scenario, the storage system 100 uses a first block allocation method (act 320). Conversely, in response to determining that the memory 104 is being used in the second usage scenario, the storage system 100 uses a second block allocation method (act 330). In one embodiment, data stored in the first usage scenario is updated less frequently than data stored in the second usage scenario, and the first block allocation method allocates blocks that are closer to needing garbage collection than the second block allocation method. In one embodiment, one block can be closer to needing garbage collection than another block if that block has a parameter (e.g., a value of a valid flash management unit (FMU) counter and/or a program/erase cycle counter) that is closer to the threshold for initiating garbage collection.

For example, there can be a clear distinction between block allocation for storage systems/memories that are used for streaming videos (extreme use case: where the entire memory 104 (e.g., flash drive) is written and then rewritten immediately, time after time) and storage systems/memories that are used for updating something online (use case: where the same logical block address (LBA) is written over and over again, such as when written a log file, doing maintenance, or performing a single address update). In the first usage scenario (drive rewrite), block allocation can be done in a more "conservative" fashion since all the data is valid, and there is no system gain of releasing blocks by garbage collection operations. However, in the second usage scenario, block allocation can be done in a more "aggressive" fashion since only few flash management units (FMUs) are valid, and there is high incentive to revive blocks fast by garbage collection operations.

So, data written in the first usage scenario (e.g., "cold storage") can be allocated to blocks that are close to their garbage-collection-initiation threshold (e.g., blocks with a high program-erase cycle (PEC) counter). Even though the blocks are close to their garbage-collection-initiation threshold, because the data will not be re-written (or have a limited number of re-writes), there is a low chance that the blocks will need garbage collection in the near term. Plus, these types of blocks would not be ideal for situations where there are multiple re-writes (the second usage scenario) because frequent re-writes to blocks that are close to their garbage-collection-initiation threshold will trigger garbage collection, which may not be preferred, as discussed above.

In contrast, data written in the second usage scenario (e.g., "many rewrites") can be allocated to blocks that are farther away from their garbage-collection-initiation threshold (e.g., blocks with a low program-erase cycle (PEC) counter or a block that has been freshly garbage collected or has garbage collected ahead of schedule). Such blocks are better suited for data that will be re-written than blocks that are closer to their garbage-collection-initiation threshold (e.g., blocks with a high program-erase cycle (PEC) counter), as such blocks are can withstand more re-writes before reaching the garbage-collection-initiation threshold.

As can be seen from these examples, choosing a block allocation method based on predicted usage behavior effectively alters when garbage collection takes place, since whether an allocated block is relatively closer to or farther away from needing garbage collection affects when garbage collection on that block occurs. As noted above, garbage collection may hinder host performance as it uses the interface from the storage system's controller 102 to the memory 104 and also uses space in both the storage system's controller 102, memory 104, and/or RAM 116. Using block allocation based on usage behavior can provide efficient garbage collection, both in terms of memory and performance. These embodiments can also reduce the memory over-provisioning needed for efficient garbage collection operations, as the overall number of allocated blocks throughout the storage system's lifetime can be lower for the same data input. These embodiments can also increase endurance and performance when the memory 104 is full.

While only two usage scenarios were discussed in the above example, it should be noted that there can be many usage scenarios in between these. In one embodiment, the storage system 100 is configured to dynamically set the block allocation scheme between "conservative" and "aggressive" based on the user's behavior or usage scenario.

There are many alternatives that can be used with these embodiments. For example, the determination of whether the memory 104 is being used in a first usage scenario or a second usage scenario (or any number of usage scenarios) can be done in any suitable way. For example, in one embodiment, the determining is performed by receiving an indication from a host as to whether the memory 104 is being used in the first usage scenario or in the second usage scenario. In another embodiment, the determining is performed by the storage system 100 (e.g., with the controller 102 being programed with an algorithm that decides whether the storage system 100/memory 104 is being used in a first usage scenario, a second usage scenario, etc., or neither/none of them. For example, in one embodiment, the controller 102 compares a plurality of write commands to patterns stored in the storage system 100. This example will be discussed in more detail in conjunction with FIGS. 4 and 5.

Figure 4:
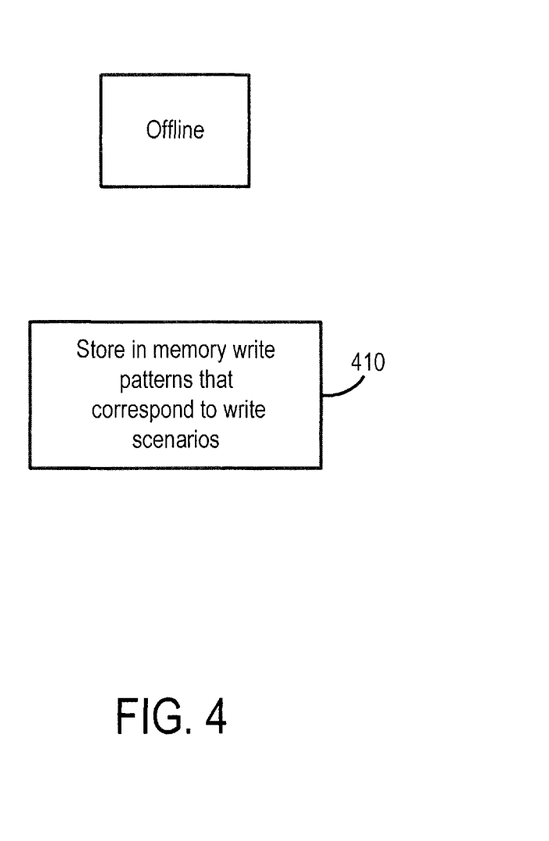
FIG. 4 is a flow chart of a method for storing patterns in a memory of an embodiment.

As shown in FIG. 4, the write patterns corresponding to various write scenarios can be stored in memory 104 (or in another storage location (e.g., ROM 118) in the storage system 100) when the storage system 100 is offline (e.g., during production, but, in one embodiment, the stored pattern can be updated during the life of the storage module 100) (act 410). For example, a number (N) of patterns can be stored that embody the patterns that optimized block allocation may be related to (e.g., a first block allocation method can be associated with one of the patterns, and a second block allocation method can be associated with another one of the patterns). A successful classification to a pattern can result in block allocation optimization for that pattern. These patterns can include, for example, logical block addresses (LBAs) or LBA ranges that a user is expected to write for a given usage scenario. The LBA write history of the user/host can be recorded and can be matched against each of the stored patterns.

Figure 5:
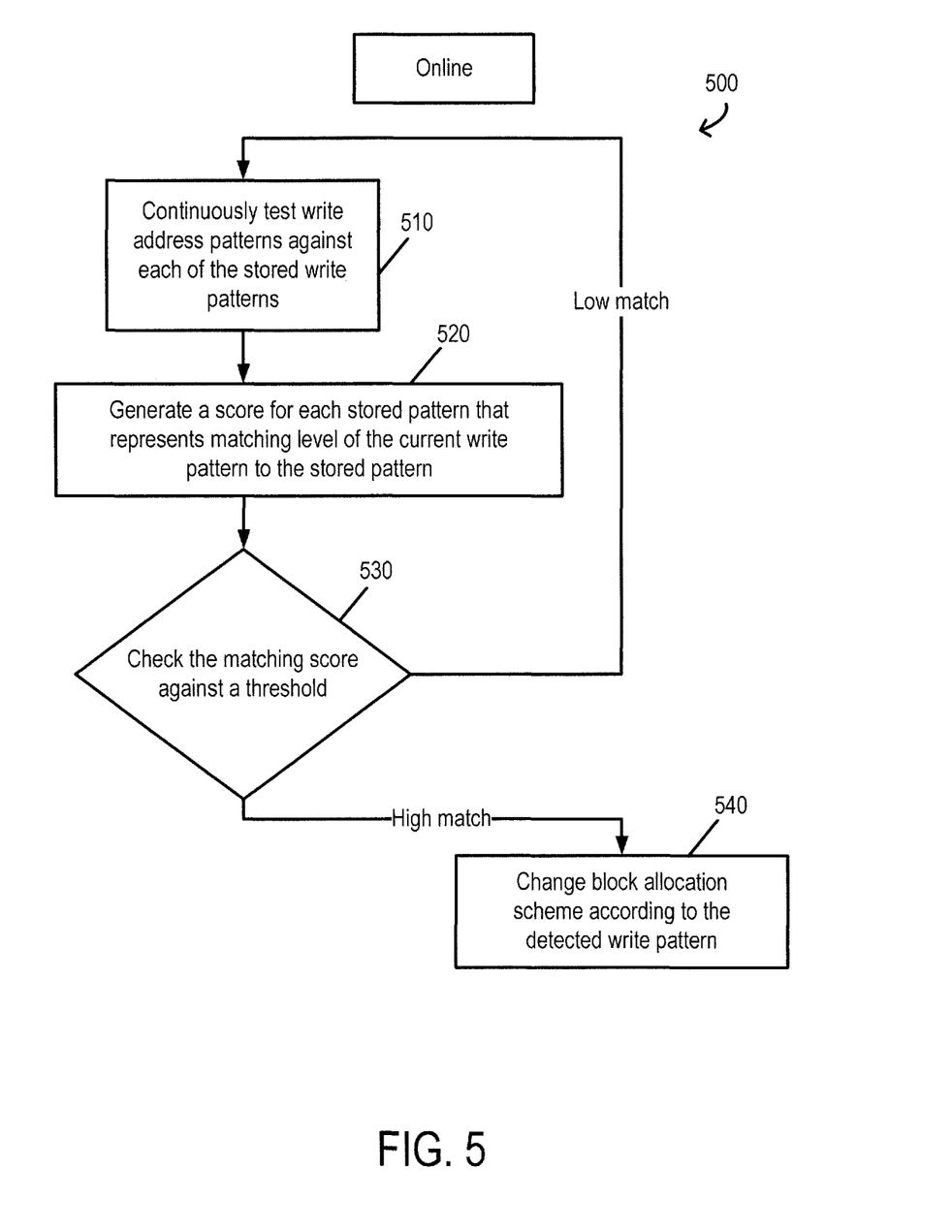
FIG. 5 is a flow chart of a method for predictive block allocation for efficient garbage collection of an embodiment in which pattern matching is used.

FIG. 5 is a flow chart 500 of a method of one embodiment that matches write addresses from write commands received by the storage system 100 against write address patterns stored in the storage system 100. In this embodiment, the acts in this flow chart 500 are performed when the storage system 100 is online. As shown in FIG. 5, in this embodiment, the storage system 100 (e.g., the controller 102 or the block allocation module 111) continuously tests write address patterns from a plurality of write commands received by the storage system 100 against patterns stored in the storage system 100 (act 510). The storage system 100 then generates a score for each stored pattern that represents a matching level of the current write pattern to the stored pattern (act 520). So, for each of the stored patterns, a score that represents the pattern's matching to the user write history is to be generated. The storage system 100 then checks the matching score against a threshold (act 530). If there is a low match, the process begins again at act 510. However, if there is a high match, the storage system 100 changes the block allocation scheme according to the detected write pattern (act 540). Accordingly, if one of the scores passes a certain threshold, then a successful match is declared. So, for example, if one of the patterns depicts constantly writing the same small range of LBAs, and a user is constantly writing 1 LBA (or a range of <100 LBAs), this pattern can be identified, and the indication can be passed to the block allocation unit, which will then act according to the "single address rewrite" usage scenario discussed above.

It should be noted that the above algorithm was just an example, and other algorithms and methods can be used. Further, many other alternatives can be used with these embodiments. For example, in addition to or as an alternative to the matching process discussed above, a "soft" measure, which can represent the pattern's matching to the user history, can be generated and used in the block allocation process, for example, by predicting of usage behavior using machine learning. In this alternative, a machine learning algorithm can be used for learning the user's access patterns and, accordingly, make the decision on the garbage collection policy (e.g., aggressive versus conservative schemes). The pattern recognition may be performed using a support vector machine (SVM) classification, a neural network, or other clustering methods, such as K-Means and/or the principal component analysis (PCA) method. Supervised (pre-calibrated) or unsupervised learning algorithms can be used (i.e., the training/calibration of the algorithm can be done with or without a labeled dataset that includes ground truth labels of relevant training examples (or even without pre-training/calibration of the model, where classifying is done directly (adaptive learning) during the life time of the device). As yet another example, the storage system 100 can predict usage behavior by calculating a ratio of the single address updates versus drive rewrites and, accordingly, adapt the ratio of triggering garbage collection operations versus host writes and/or the ratio of dynamic versus static garbage collection operations. Further, instead of the storage system 100 doing the predicting, the host can do the predicting and send an indication of the results to the storage system 100.

Further, in addition to or instead of allocating blocks based on usage behavior, the storage system 100 can alter the time of garbage collection initialization by adjusting at least one threshold parameter for initiating garbage collection in a block of memory 104. Examples of threshold parameters include, but are not limited to, a number of valid units in the block and a number of program/erase cycles performed in the block. As another example, the time of garbage collection initialization can be altered by performing garbage collection in a block ahead of schedule (e.g., in response to predicting that data to be stored in the block will have frequent updates).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for block allocation, the method comprising:
   determining whether a memory in a storage system is being used in a first usage scenario or a second usage scenario by:
   receiving a plurality of write commands which define a current write pattern;
   comparing the current write pattern to a first write pattern which is defined by a first plurality of example write commands, stored in the storage system and corresponding to the first usage scenario and to a second write pattern which is defined by a second plurality of example write commands, stored in the storage system and corresponding to the second usage scenario;
   generating a first score that represents a matching level of the current write pattern to the first write pattern and generating a second score that represents a matching level of the current write pattern to the second write pattern;
   determining whether the first score or the second score exceeds a threshold;
   in response to the first score exceeding the threshold, determining that the memory is being used in the first usage scenario; and
   in response to the second score exceeding the threshold, determining that the memory is being used in the second usage scenario;
   in response to the memory being used in the first usage scenario, using a first block allocation method; and
   in response to the memory being used in the second usage scenario, using a second block allocation method;
   wherein the first block allocation method comprises allocating first blocks and the second block allocation method comprises allocating second blocks, wherein the first blocks are closer to needing garbage collection than the second blocks.

2. The method of claim 1, wherein the determining whether the memory is being used in the first usage scenario or the second usage scenario is performed using machine learning.

3. The method of claim 2, wherein the machine learning uses supervised learning.

4. The method of claim 2, wherein the machine learning uses unsupervised learning.

5. The method of claim 1, wherein the determining whether the memory is being used in the first usage scenario or the second usage scenario further comprises calculating a ratio of user single address updates versus drive rewrites.

6. The method of claim 1 further comprising altering a time of garbage collection.

7. The method of claim 6, wherein the altering the time of garbage collection comprises adjusting at least one threshold parameter for initiating garbage collection.

8. The method of claim 6, wherein the altering the time of garbage collection comprises altering a ratio of triggering garbage collection operations versus host write.

9. The method of claim 6, wherein the altering the time of garbage collection comprises altering a ratio of dynamic versus static garbage collection operations.

10. The method of claim 1, wherein data stored in the first usage scenario is updated less frequently than data stored in the second usage scenario.

11. The method of claim 1, wherein the memory comprises a three-dimensional memory.

12. The method of claim 1, wherein the method is performed in the storage system.

13. The method of claim 1, wherein the first usage scenario is a drive rewrite scenario.

14. The method of claim 1, wherein the first write pattern is based on the first plurality of example write commands repeatedly writing a same range of logical block addresses (LBAs).

15. The method of claim 1, wherein each of the current write pattern, the first write pattern, and the second write pattern comprises a logical block address (LBA) write history.

16. The method of claim 1, wherein each of the current write pattern, the first write pattern, and the second write pattern comprises a pattern of write addresses.

17. A storage system comprising:
   a memory; and
   a controller in communication with the memory, wherein the controller is configured to:
   receive a plurality of write commands which define a current write pattern;
   compare the current write pattern to a first write pattern which is defined by a first plurality of example write commands, corresponding to a first usage scenario and a second write pattern which is defined by a second plurality of example write commands, corresponding to a second usage scenario;
   generate a first score that represents a matching level of the current write pattern to the first write pattern and generate a second score that represents a matching level of the current write pattern to the second write pattern;
   determine whether the first score or the second score exceeds a threshold;
   in response to the first score exceeding the threshold, use a first block allocation method; and
   in response to the second score exceeding the threshold, use a second block allocation method, different from the first block allocation method;

wherein the first block allocation method allocates blocks that are closer to needing garbage collection than blocks allocated by the second block allocation method.

18. The storage system of claim 17, wherein the controller is further configured to adjust at least one threshold parameter for initiating garbage collection.

19. The storage system of claim 17, wherein the memory comprises a three-dimensional memory.

20. The storage system of claim 17, wherein the storage system is embedded in a host.

21. The storage system of claim 17, wherein the storage system is removably connected to a host.

22. A storage system comprising:
a memory;
means for receiving a plurality of write commands which define a current write pattern;
means for comparing the current write pattern to a first write pattern which is defined by a first plurality of example write commands, corresponding to a first usage scenario and to a second write pattern which is defined by a second plurality of example write commands, corresponding to a second usage scenario;
means for generating a first score that represents a matching level of the current write pattern to the first write pattern and generating a second score that represents a matching level of the current write pattern to the second write pattern;
means for determining whether the first score or the second score exceeds a threshold; and
means for choosing a first block allocation method in response to the first score exceeding the threshold and for choosing a second block allocation method in response to the second score exceeding the threshold, wherein the first block allocation method allocates blocks that are closer to needing garbage collection than blocks allocated by the second block allocation method.

23. The storage system of claim 22, wherein the means for receiving, the means for comparing, the means for generating, the means for determining and the means for choosing comprise a controller.

24. The storage system of claim 22, wherein the memory comprises a three-dimensional memory.

* * * * *